July 18, 1961  A. E. COBB ET AL  2,992,585
APPARATUS FOR TRACKING MOVING TARGETS
Filed Oct. 31, 1956
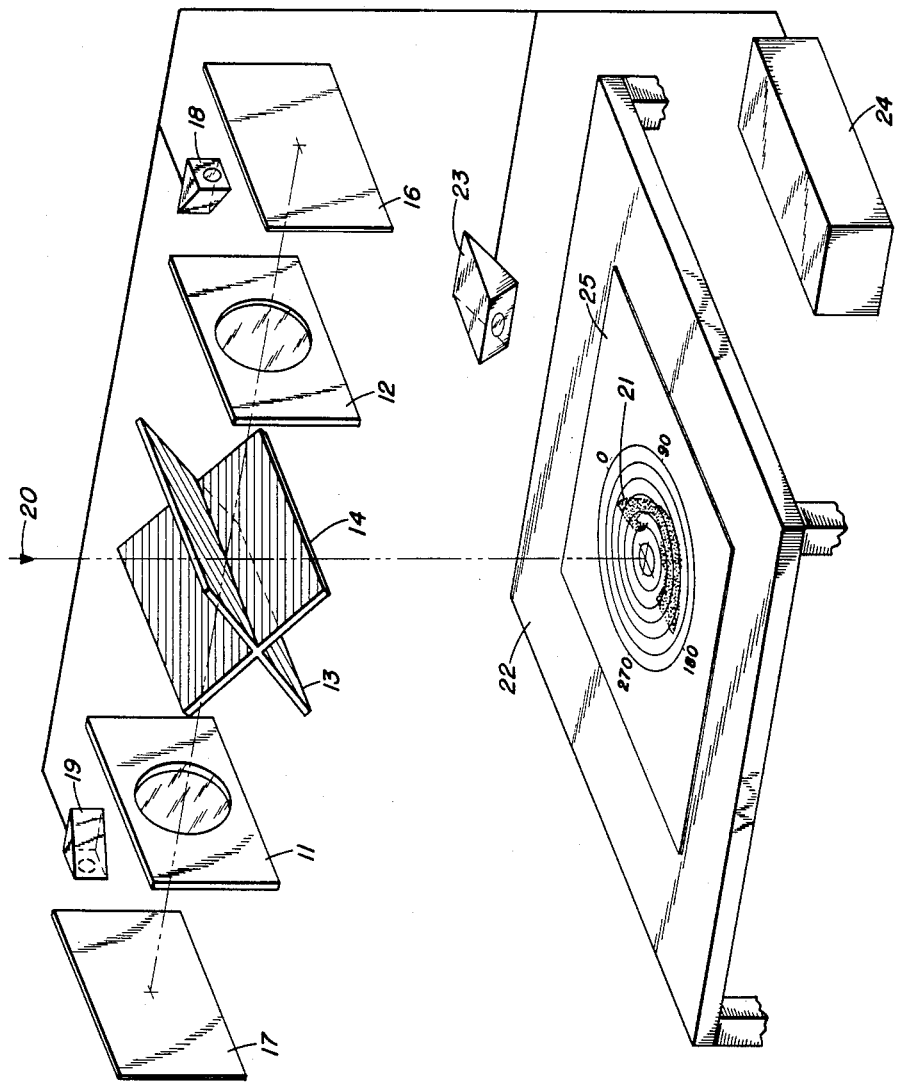
INVENTORS
ALFRED E. COBB
CARL ALEXOFF
BY
ATTORNEYS

2,992,585
APPARATUS FOR TRACKING MOVING TARGETS
Alfred E. Cobb, 18629 Tulsa St., North Ridge, Calif., and Carl Alexoff, 17 Woodlawn Drive, California, Md.
Filed Oct. 31, 1956, Ser. No. 619,650
2 Claims. (Cl. 88—1)
(Granted under Title 35, U.S. Code (1952), sec. 266)

The invention described herein may be manufactured and used by or for the Government of the United States of America for governmental purposes without the payment of any royalties thereon or therefor.

The present invention relates to apparatus for tracking moving targets and more particularly to apparatus for tracking moving targets by color mixing.

The present method of securing information from a radar tracking plane is to have an operator view the radar scope and then transmit what he views on the scope to a central control station.

This method of operation has very serious disadvantages in that the number of targets that the operator can record on a status board is limited; no method of bookkeeping is presently available whereby past conditions can be referred to if necessary; the radar operator's eye has limited ability to detect slow movements; and a more proficient operator is required to identify moving targets.

The present invention comprises an optical system which utilizes a pair of mutually perpendicular transparent reflecting surfaces for projecting the images of two photographs of a radar scope presentation onto a prepared plotting board. The reflecting surfaces are preferably made of colored Plexiglass, one being amber and the other blue, to indicate movement of targets which are being tracked. Glass prisms and color filters could be used in lieu of the colored Plexiglass.

This apparatus has the advantage of permitting the tracking of the movement of targets with a sharp-pointed lead-pencil on plotting paper, which then serves as a permanent record. Normally, a thick-pointed grease pencil is used on the face of the radar scope and the mark obscures the target. That the photographic images may be superimposed upon plotting paper which can have an outline of the area including latitude and longitude lines, known landmarks, names of towns and cities, etc., is another advantage. Further, photographs serve as a permanent record which can be viewed at a later date if necessary, or be used for realistic training of personnel without their having to be airborne.

Accordingly, an object of the present invention is the provision of an apparatus for the purpose of tracking targets.

Another object is to provide an optical projection apparatus for comparing radar presentations.

A further object of the invention is the provision of an optical projection apparatus for comparing a photograph of a radar presentation with another photograph of a radar presentation taken at a later time.

A further object is to provide an apparatus for tracking targets by radar wherein highly skilled personnel are not required.

Other objects and many of the attendant advantages of this invention will be readily appreciated as the same becomes better understood by reference to the following detailed description when considered in connection with the accompanying drawings wherein:

The single figure shows a schematic diagram of a preferred embodiment of the apparatus according to the invention.

Referring now to the drawing, there are shown two double-convex converging lenses 11 and 12 with a pair of mutually perpendicular transparent reflecting surfaces 13 and 14 mounted between them. The lenses are so mounted that their principal axes are on a common line passing through the midpoint of the line of intersection of the semi-reflecting surfaces. The semi-reflecting surfaces 13 and 14 are preferably made of colored Plexiglas, one being amber and the other blue. Glass prisms and color filters could be used in lieu of the colored Plexiglas. On the other side of each lens is a photograph 16, 17 of a radar scope presentation taken with an oscillograph recording camera. Obviously a radar scope could be substituted for one of the photographs to provide a radar scope presentation. A pair of light sources 18, 19 are provided to direct light onto the photographs 16, 17, respectively. A plotting board 22 for supporting radar charts, etc. is provided below the reflectors 13 and 14, the board 22 being provided with a third light source 23. The light sources 18, 19 and 23 are connected in a circuit with a timer 24 and separate switches, not shown.

In use, when light from light sources 18 and 19 falls on photographs 16 and 17, reflections from the photographs 17 and 16 are passed through the lenses 11 and 12 respectively and magnified. The crossed semi-reflecting surfaces 13 and 14 act as partial mirrors, and when viewed from above as indicated by the arrow 20, a virtual image 21 occurs at a point below the crossed surfaces. The distance from the photographs to the lenses is made adjustable by any well known means (not shown) so that the virtual image from each photograph can be made to appear at the same depth below the crossed surfaces 13, 14 on plotting board 22 since board 22 is below the crossed surfaces at a distance equal to the apparent depth of the virtual image. A real image is not formed since photographs 16 and 17 are respectively between lenses 12 and 11 and their principal foci.

Due to the transparency of the crossed surfaces, not only do the images from each photograph appear to be superimposed on the plotting surface 25, but actual plots can be made when light from the light source 23 is permitted to fall on the plotting surface. The lights 18, 19 and 23 are caused to be "on steady," "off" or "flash" independently of each other by means of the timer 24 and switches, above mentioned.

Since the reflecting surfaces are amber and blue, the image of one photograph is amber and the image of the other is blue. When the two photographs are slewed until their images coincide, the resulting image is neither blue nor amber but white, since blue light and amber light are complementary and result in white light when mixed. Where the images do not coincide, no color mixing takes place and the blue and amber colors are very evident. Therefore, when two successive radar scope photographs are viewed, moving targets will stand out in color since their images will not coincide. If an azimuth scale, range marks and/or longitude and latitude lines are inscribed on the plotting surface, the course and speed of any moving target can be readily obtained since the time interval between photographs will be known.

Normally, the first photograph taken would be placed in one side of the viewer and slewed in such a manner that the image lined up with a prepared chart on the plotting surface. Using a fine point lead-pencil, the position of the radar targets of interest would be marked upon the plotting paper using the figure zero. The second photograph taken would be placed in the other side of the viewer and lined up with the prepared chart. Targets of interest would be marked with a small figure two, assuming that two minutes elapsed between the taking of the two photographs. With timer 24, set to "flash," the lights 18, 19 and 23 are time shared, i.e., each light is on for only one-third of a time period, for example, one-tenth of a second. The result is that the targets which are displaced on successive photographs appear to be jumping back and forth. By noting which color represents the photograph taken earlier, the targets moving back and forth could be assumed to be moving from the color representing the earlier photograph to the other color and thus permitting the course and speed of the moving target to be determined. By using the FIGURES 0, 2, 4, etc. (representing elapsed time between photographs) to denote the location of the targets, it is only necessary to note the distance traveled during the time interval between photographs to determine the speed of the target.

Obviously many modifications and variations of the present invention are possible in the light of the above teachings. It is therefore to be understood that within the scope of the appended claims the invention may be practiced otherwise than as specifically described.

What is claimed is:

1. Apparatus for tracking moving targets comprising: first and second converging lenses with principal foci on a line bisecting the line of intersection of a pair of mutually perpendicular transparent reflecting surfaces mounted between said first and second converging lenses, first and second radar scope presentations, a first and second light source directing light onto said first and second radar scope presentations producing a reflection thereof, said first radar scope presentation being positioned in line with said first converging lens such that said first converging lens is between said reflecting surfaces and said first radar scope presentation, said second radar scope presentation being positioned in line with said second converging lens such that said second converging lens is between said reflecting surfaces and said second radar scope presentation, said lenses serving to magnify the image prior to its striking said reflecting surfaces, a plotting board mounted directly below said reflecting surfaces, a third light source which directs light onto said plotting board, a variable timing device operably connected to each of said three light sources, said timing device sequentially energizing said first, second and third light sources whereby the presentation on said plotting board indicates the course of said moving targets on said radar scope and also makes possible a determination of its speed.

2. In an apparatus of the kind described, a first and second convex converging lens with principal foci on a common line, a pair of mutually perpendicular transparent reflecting surfaces mounted between said first and second lenses, first and second radar scope presentations, a first and second light source directing light onto said first and second radar scope presentations producing a reflection thereof, said first presentation being positioned in line with the principal focus of said first lens such that said first lens is between said first presentation and said reflecting surfaces, said lenses serving to magnify the image prior to its striking said reflecting surfaces, said second presentation being positioned in line with the principal focus of said second lens such that said second lens is between said second presentation and said reflecting surfaces, a plotting board mounted directly below said reflecting surfaces, a third light source which directs light onto said plotting board, a variable timing device operably connected to each of said three light sources, said timing device sequentially energizing said first, second and third light sources whereby a virtual image of each of said first and second radar presentations appears to be superimposed on a suitable chart placed on said plotting board permitting the course and speed of said presentations on said radar scope to be tracked and determined, respectively.

References Cited in the file of this patent

UNITED STATES PATENTS

| | | |
|---|---|---|
| 1,713,498 | Cooke | May 14, 1929 |
| 1,946,925 | Ames | Feb. 13, 1934 |
| 2,301,826 | Steudel et al. | Nov. 10, 1942 |
| 2,352,777 | Douden | July 4, 1944 |
| 2,460,350 | Hinman | Feb. 1, 1949 |
| 2,470,912 | Best et al. | May 24, 1949 |
| 2,506,127 | Allen | May 2, 1950 |
| 2,555,106 | Beazley | May 29, 1951 |
| 2,586,772 | Ashby et al. | Feb. 26, 1952 |
| 2,597,636 | Hall et al. | May 20, 1952 |
| 2,621,555 | Fleming-Williams et al. | Dec. 16, 1952 |
| 2,642,487 | Schroeder | June 16, 1953 |
| 2,704,960 | Loud | Mar. 29, 1955 |
| 2,705,758 | Kaprelian | Apr. 5, 1955 |
| 2,780,132 | Dickson | Feb. 5, 1957 |